Nov. 3, 1953 P. L. PENDLETON 2,657,565
APPARATUS FOR FLUID TREATMENT OF STRAND MATERIAL
Filed Oct. 2, 1947 10 Sheets-Sheet 1

INVENTOR
PYAM L. PENDLETON
BY Edgar H. Kent
ATTORNEY

Nov. 3, 1953        P. L. PENDLETON        2,657,565

APPARATUS FOR FLUID TREATMENT OF STRAND MATERIAL

Filed Oct. 2, 1947        10 Sheets-Sheet 3

INVENTOR
PYAM L. PENDLETON
BY
ATTORNEY

Nov. 3, 1953 P. L. PENDLETON 2,657,565
APPARATUS FOR FLUID TREATMENT OF STRAND MATERIAL
Filed Oct. 2, 1947 10 Sheets-Sheet 4

INVENTOR
PYAM L. PENDLETON
BY Edgar H. Kent
ATTORNEY

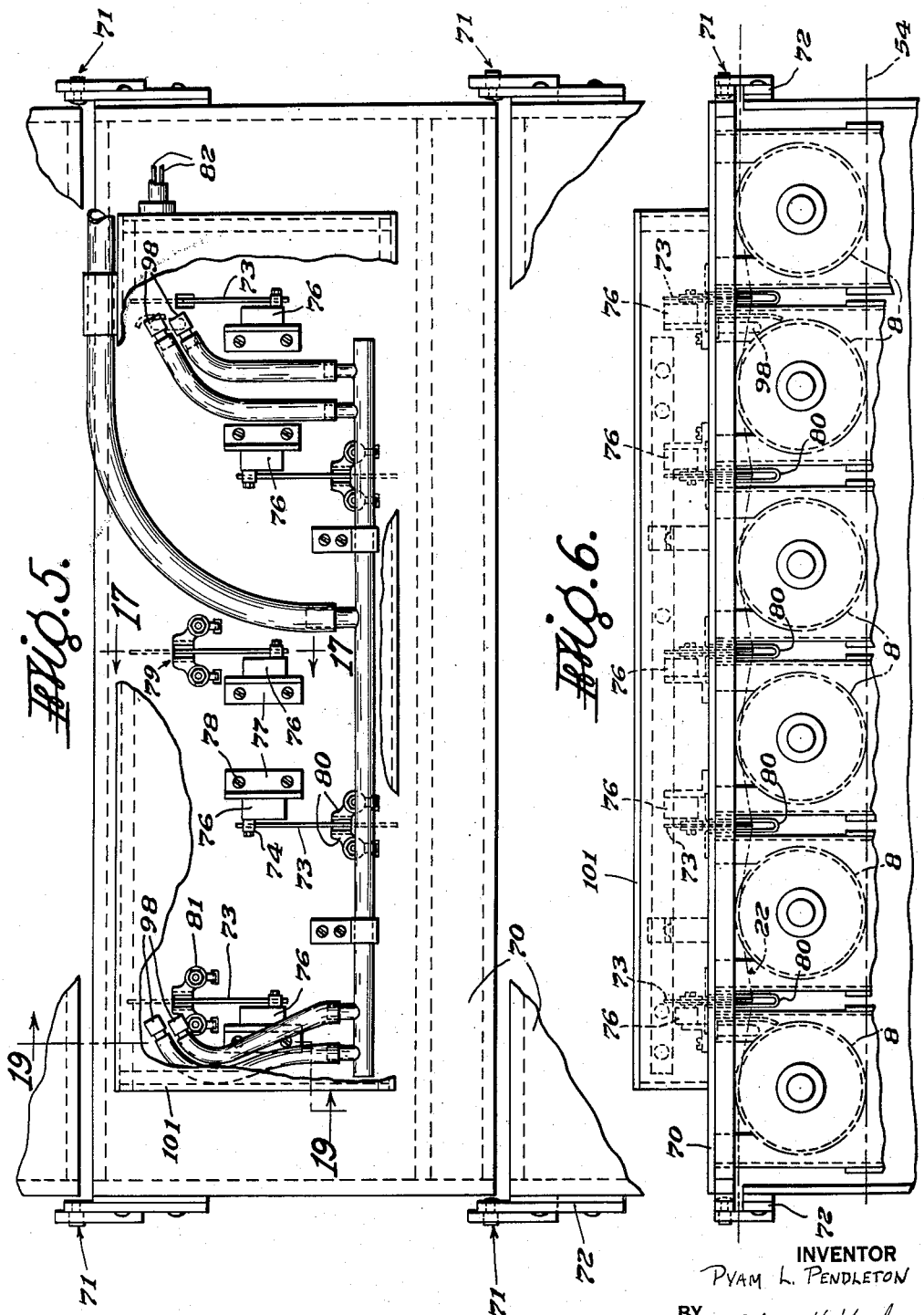

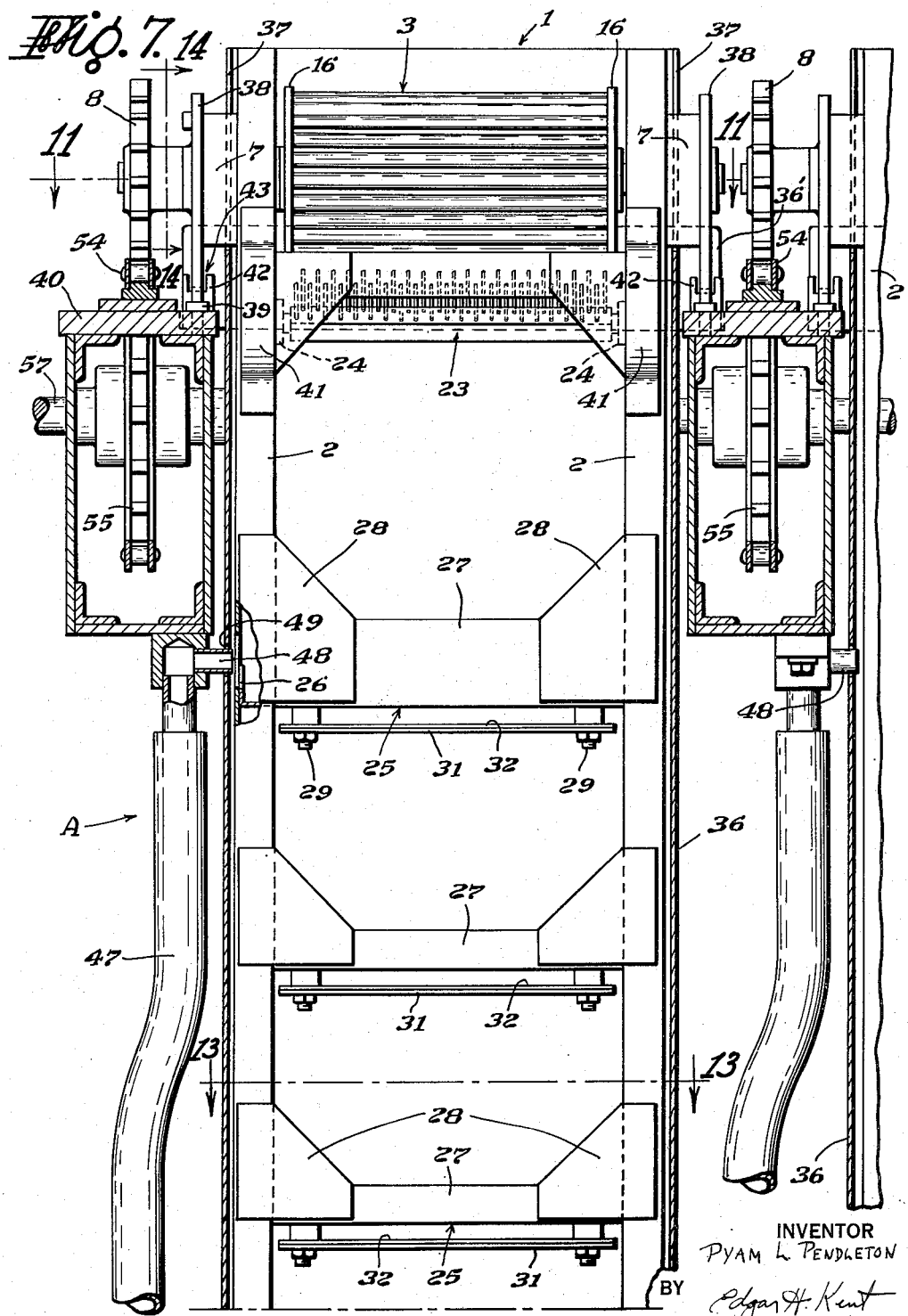

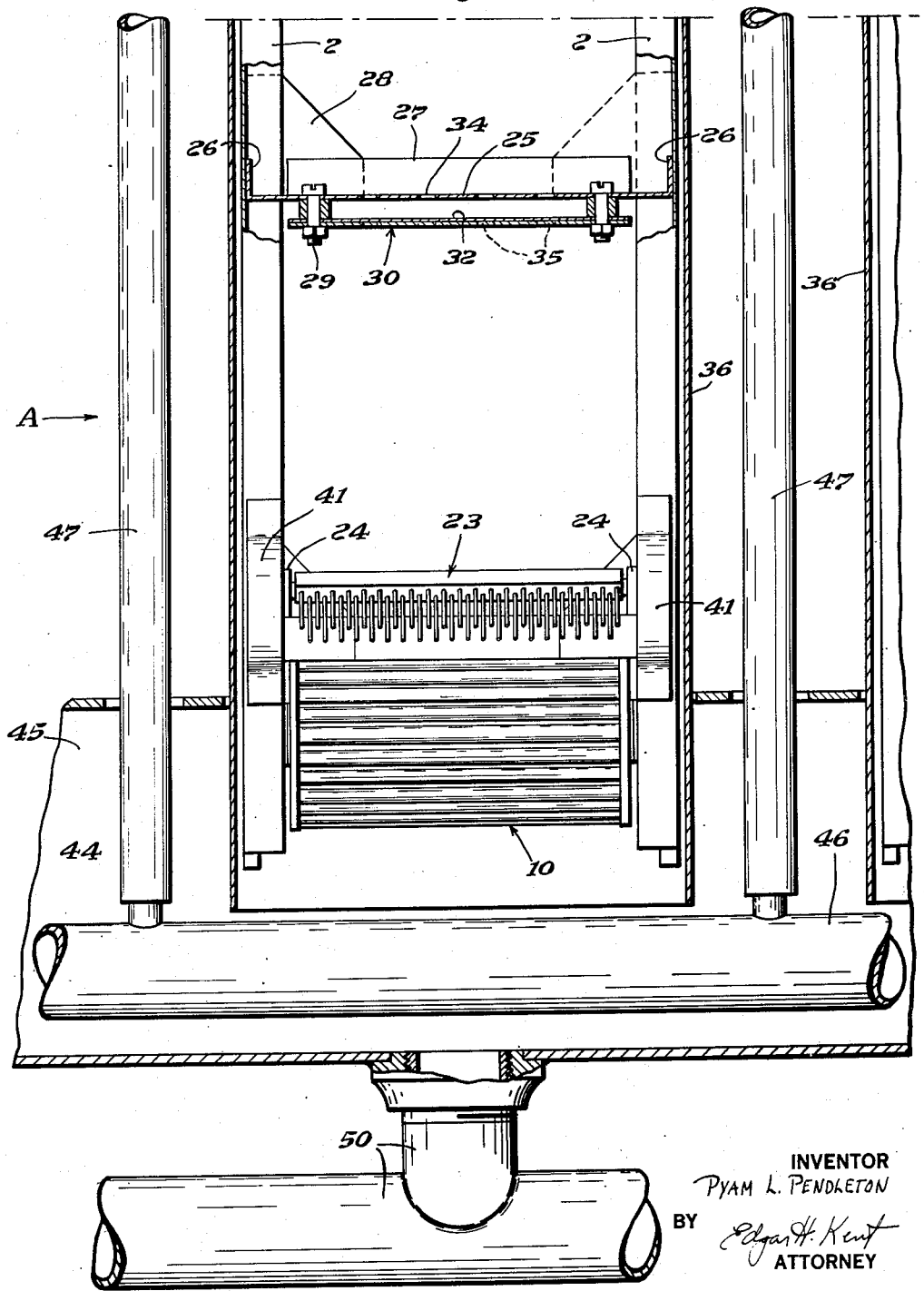

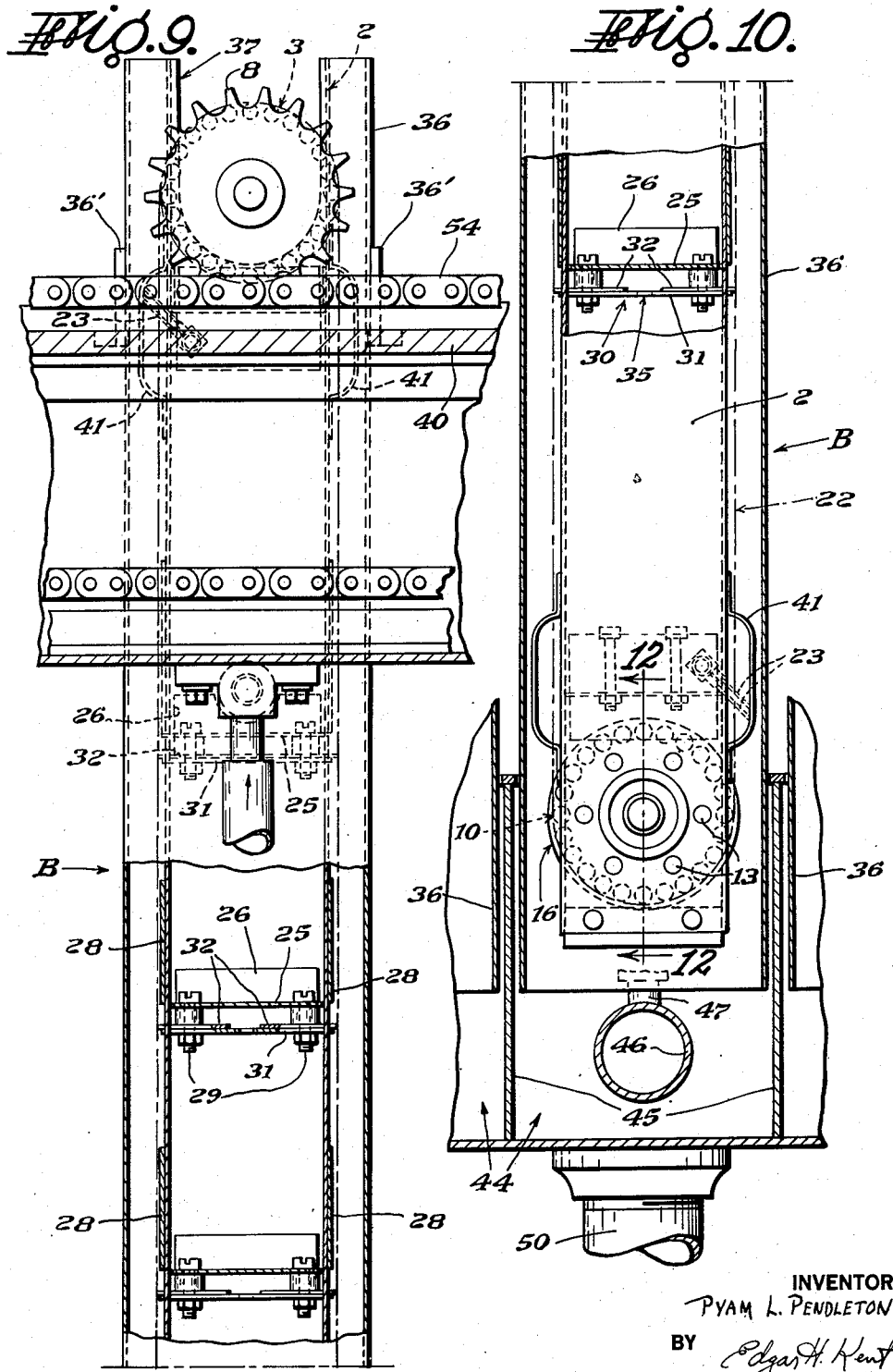

Nov. 3, 1953     P. L. PENDLETON     2,657,565
APPARATUS FOR FLUID TREATMENT OF STRAND MATERIAL
Filed Oct. 2, 1947     10 Sheets-Sheet 9
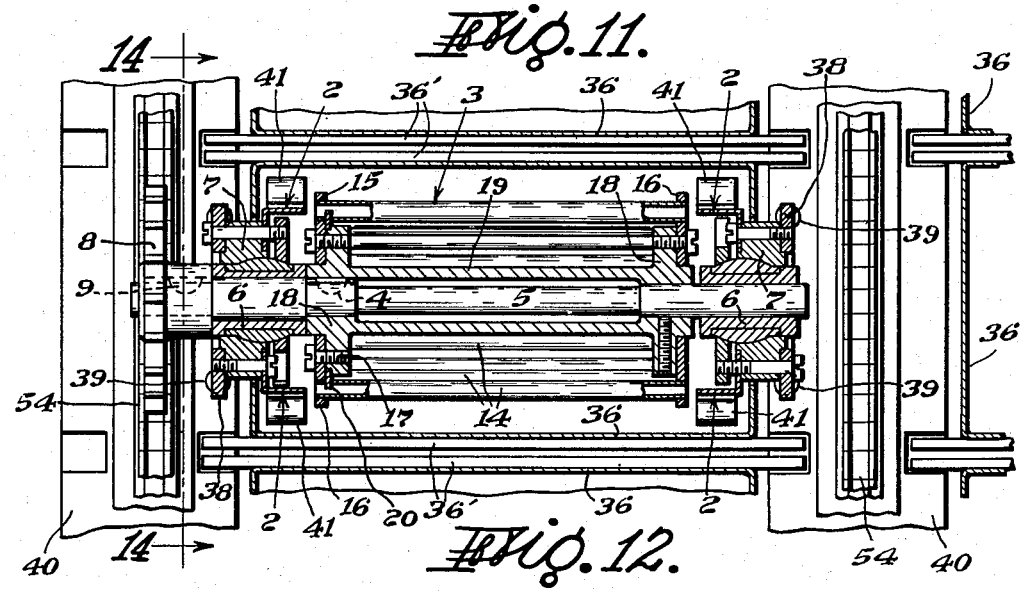
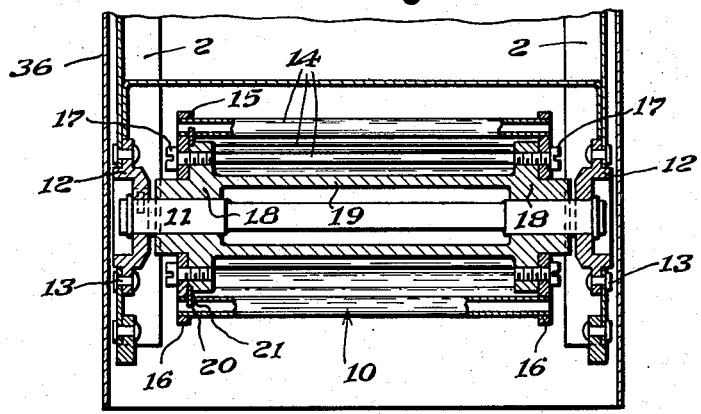
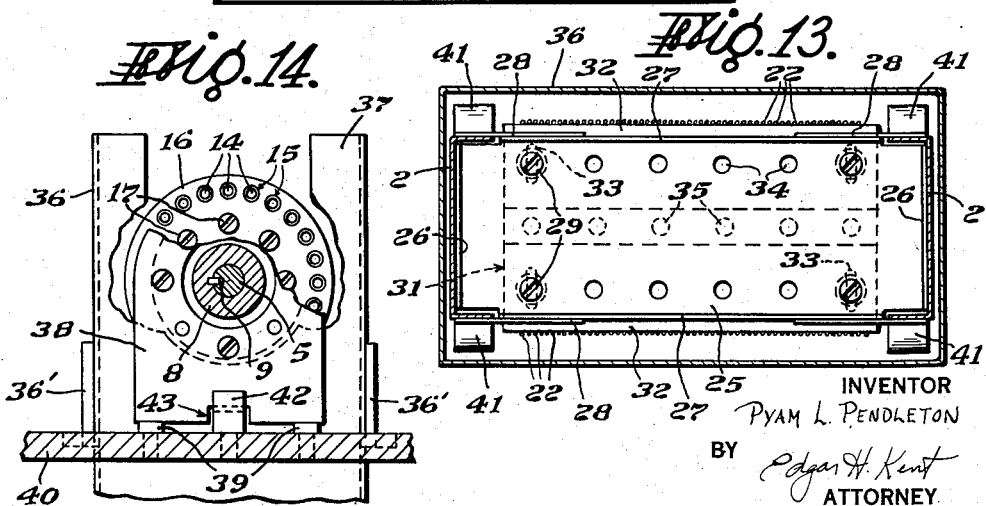
INVENTOR
PYAM L. PENDLETON
BY
Edgar H. Kent
ATTORNEY Nov. 3, 1953  P. L. PENDLETON  2,657,565
APPARATUS FOR FLUID TREATMENT OF STRAND MATERIAL
Filed Oct. 2, 1947  10 Sheets-Sheet 10
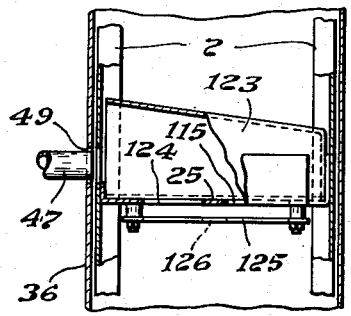
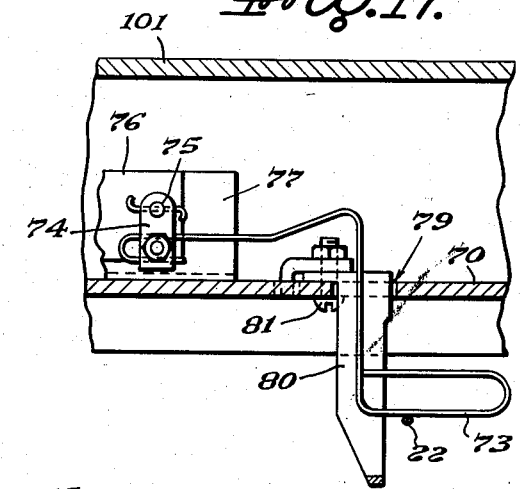
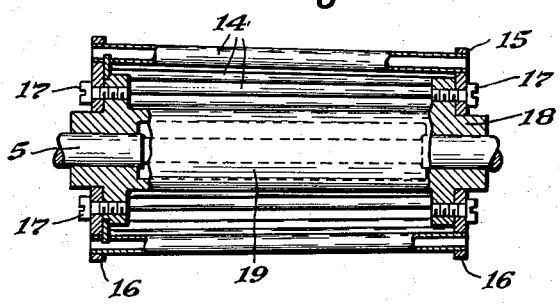
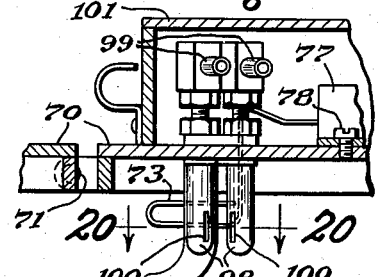
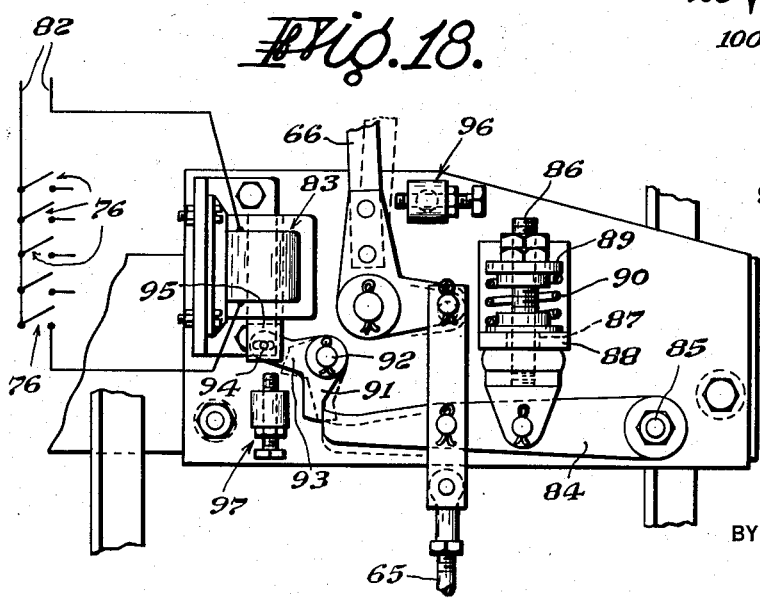
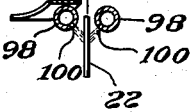
INVENTOR
PYAM L. PENDLETON
BY
ATTORNEY Patented Nov. 3, 1953

2,657,565

UNITED STATES PATENT OFFICE 2,657,565

APPARATUS FOR FLUID TREATMENT OF STRAND MATERIAL

Pyam L. Pendleton, Edgewood, R. I., assignor, by mesne assignments, to Hampton Machine Company, Providence, R. I., a corporation of Rhode Island Application October 2, 1947, Serial No. 777,445

8 Claims. (Cl. 68—205)

1

This invention relates to the continuous treatment of traveling ends of yarn or other strands or filaments, in which each end is separately treated as it travels from a supply package to a repackaging device.

One object of the invention is to provide a storage device through which the strand travels in a multiplicity of relatively closely spaced convolutions in combination with means for applying a treating fluid to the traveling strand, the parts being so combined and arranged that the strand will be efficiently treated even when traveling through the unit at speeds of the order of 400 yards per minute or more.

A further object is to provide a unit of this kind sufficiently adaptable and flexible in its range of operation so that a plurality of the units may be so coordinated that the operation of each is integrated with the operation of the others making up the combination to permit a variety of relatively complicated treatments to be carried out according to desired specifications.

Another specific object is to provide means for applying adequate treating fluid to yarns or other strands traveling at high speeds without physically overloading the material at any point in its travel in a given storage device or a combination of such devices.

Other and further objects residing in the means for controlling the tensions in the strand, features of the fluid supply and distribution and other details of the construction will be made apparent in the following specification and claims.

In general two or more of the storage-treating units are arranged in file and a single end of the material is passed through the file to receive a complete treatment. Each unit includes a casing or cell in which the storage and associated treating mechanisms are housed. As later more fully described a plurality of files may be arranged in ranks, and the cells in the rank and file arrangement may be provided with a common supporting base structure through which the treating fluids or liquids are distributed or circulated in the direction of the ranks or files of the units, or a combination of such directions.

For purpose of illustration the embodiment hereinafter described and disclosed in the drawings is shown as adapted to carry out a continuous mercerizing process in which the yarn is saturated with a caustic fluid, subjected to four or more washing operations for the removal of the caustic, dried and wound into packages.

2

In the accompanying drawings:

Fig. 5 is a detail plan view of the cover arrangement of a file of units, parts broken away;

Fig. 6 is a fragmentary elevational view of the structure shown in Fig. 5;

Fig. 7 is a sectional view substantially on line 7—7 of Fig. 2, showing the upper portion of a storage-treating unit on a larger scale, parts being broken away;

Fig. 8 is a similar view of the lower portion of the unit; Figs. 7 and 8 together forming a complete sectional elevational view of the unit;

Fig. 9 is a side elevational view of the portion of the unit shown in Fig. 7, parts being broken away;

Fig. 10 is similar view of the structure shown in Fig. 8, parts being broken away;

Fig. 11 is a sectional view substantially on line 11—11 of Fig. 7;

Fig. 12 is a sectional view substantially on line 12—12 of Fig. 10;

Fig. 13 is a sectional view substantially on line 13—13 of Fig. 7;

Fig. 14 is a sectional view substantially on line 14—14 of Fig. 11, parts being broken away;

Fig. 15 is a detail view, partly in section, of the air supply of one of the drying units;

Fig. 16 is a detail view partly in section, of a unit roll adjusted to a substantial taper;

Fig. 17 is a sectional view substantially on line 17—17 of Fig. 5, showing one of the drop wires;

Fig. 18 is a detail view of a control mechanism;

Fig. 19 is a sectional view substantially on line 19—19 of Fig. 5, showing one of the fluid stripping devices;

Fig. 20 is a section on line 20—20 of Fig. 19;

Fig. 21 is a fragmentary detail view of the windup mechanism; and

Fig. 22 is a fragmentary detail view showing the portion of the fluid circulating system at the base of the machine.

Figure 1:
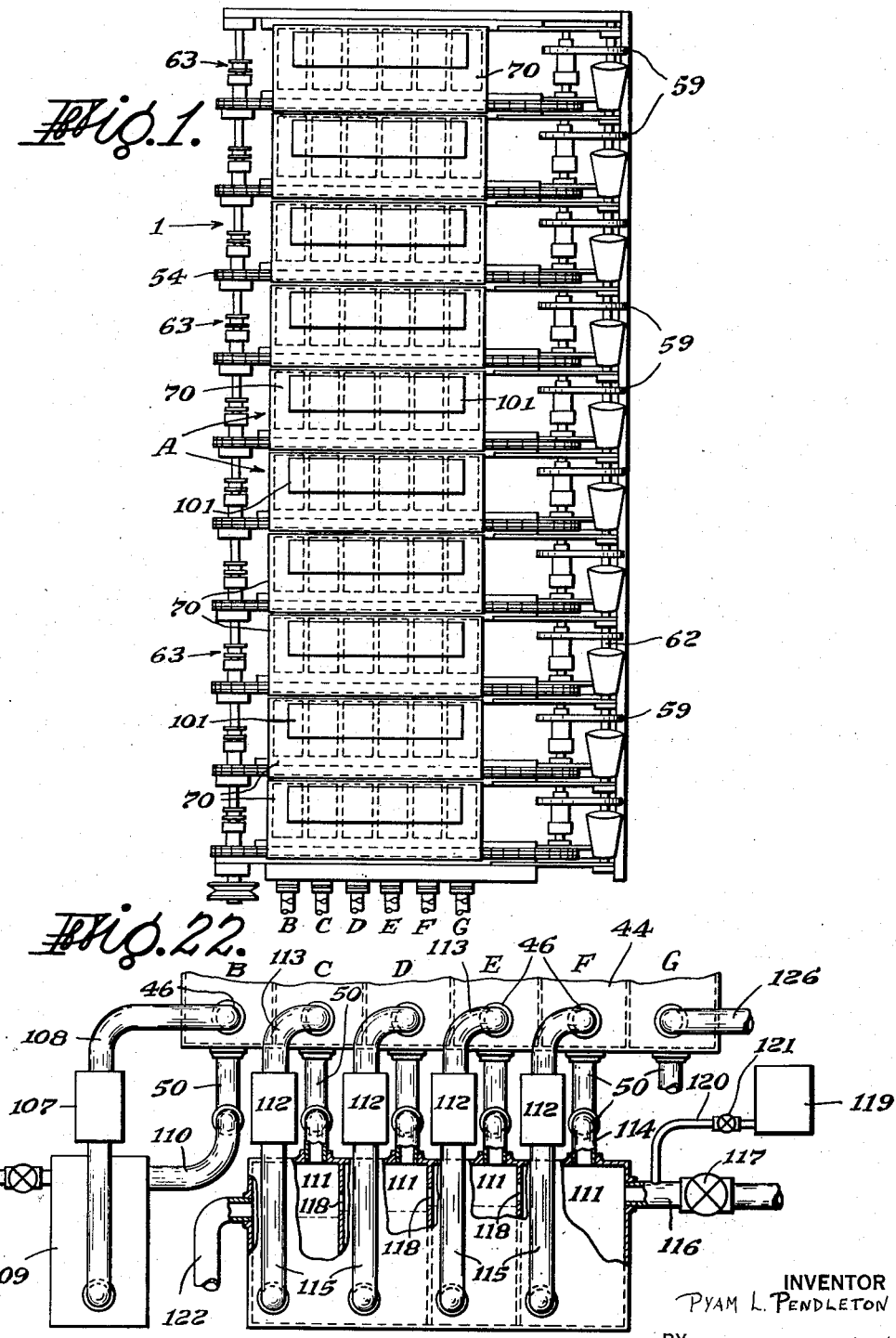
Fig. 1 is a plan view, in part diagrammatic, of a machine embodying the invention.

Referring to the drawings, the storage treating units are generally indicated at 1, Fig. 1. These units are arranged in a plurality of files A and the corresponding units in each file are arranged in ranks B, C, D, E, F and G. Each unit, as best shown in Figs. 7 to 14 inclusive, comprises a vertically elongated frame including opposed side channel members 2. A roll 3 is splined at 4 (Fig. 11) on a shaft 5 journaled in suitable bearings 6 formed in end members 7 secured to the upper end portions of channel members 2. One end of shaft 5 extends outwardly of its bearing 6, a drive sprocket 8 being splined at 9 to the extending end.

A second roll 10 (Fig. 12) is rotatably mounted on a shaft 11 secured in hubs 12, riveted at 13 to the lower ends of channel members 2.

The roll surfaces are made up of a plurality of rods 14 (Figs. 11, 12 and 14) carried in openings 15 formed in annular members 16 secured as by machine screws 17 to flanges 18 extending from the roll hubs 19. The rods 14 are held against longitudinal movement in the openings 15 by an annular key 20, held between one of the annular members 16 and the adjacent flange 18, and engaging in slots 21 in the rods. For reasons later explained it is in some cases desirable or necessary to have the surface of the rolls taper from one end of the roll to the other. By the construction just described the desired degree of taper is provided by using annular members 16 at opposite ends of the roll in which the openings 15 are positioned at different radial distances from the axis of rotation of the roll, thus providing the desired inclination of the rods relative to the axis of the rolls 16. Within reasonable limits the effective diameter or taper of the rolls is thus easily adjustable.

As later more fully described the strand of material 22 to be treated travels in a plurality of convolutions around the rolls 3 and 10, the convolutions temporarily forming the strand into spaced oppositely traveling sheets. The desired spacing between the convolutions is maintained by comb members 23 (Figs. 7 and 8) positioned respectively adjacent rolls 3 and 10 and frictionally pivoted in blocks 24 secured to the side channel members 2.

As best shown in Figs. 7, 8 and 13 a plurality of box-like cross members 25 extend between the channel members 2. Members 25 have end flanges 26 welded or otherwise secured to the webs of the channel members, and side flanges 27 which are similarly connected to the flanges of the channel members by plates 28. Suspended below one or more of the cross members 25 by bolts 29 are fluid applying members generally indicated at 30. As best shown in Figs. 9, 10 and 13, members 30 comprise a center plate 31 and spaced edge plates 32 which are mounted, by elongated slots 33, on the bolts 29, for adjustment relative to the center plate 31.

Treating fluid is supplied to uppermost member 25, by means later described, flowing through openings 34 onto the member 30, where it flows in a sheet over plates 31 and 32 to the edges of the latter to be picked up by the traveling sheet of yarn convolutions. The plates 32 are preferably adjusted to contact the yarn, as indicated in Fig. 13. However, a slight clearance between the yarn and the plates may be provided if desired, as where the strand being treated is too delicate to withstand the slight frictional drag of the plates. The yarn travels through and receives the treating fluid from the "bead" of liquid formed at the edges of the plates. As shown, liquid is supplied to the uppermost member 25 only, the supply being in excess of the needs of the associated member 30. The excess liquid passes through openings 35, in center plate 31, to the members 25—30 below for similar application to the strand, and so on to and through succeeding members 25—30.

A particular advantage of the fluid supply means above described is its ability to apply treating fluid to the strand when the convolutions of the latter are traveling at very high speeds and at the same time supply the treating fluid in adequate quantity without subjecting the strand to undesirable strains. The fluid supplied to the plate flows in a thin sheet to the edge of the plate where it is picked up by the traveling strand convolutions. The convolutions in effect travel through a thin flaccid sheet of the fluid at the edge of the plate. As the fluid is carried away from the edge of the plate by the strand convolutions, more fluid flows freely outwardly to take its place. Due to lubrication by the fluid, the frictional drag of the edges of the plates on the strand is but slight.

By adjusting the rate of supply to the ability of the strand convolutions to carry it away the rate of flow of the sheet of treating fluid over the plate is made commensurate to the speed of travel of the strand sheet. While this is an ideal condition which may not be completely realized in practice it can be practically approximated by adjusting the rate of flow of the treating fluid to the plates and by adjusting the size of the bypass openings 35. Where the viscosity of the treating fluid is high enough to be a factor, or in the case of highly absorbent strands, the surface of the plate may be inclined downwardly toward the traveling strand sheet to maintain a flow commensurate with the needs of the strand. In any event, the maximum quantity of treating fluid which the strand can carry away and absorb or react to, or a slight excess of such an amount, can be supplied to the strand without imposing prejudicial pressure, weight or friction to the structure of the strand as is the case where pressure jets are used or where the strand is moved rapidly through a substantial body of treating fluid as in immersion methods. Even where the immersion in a body of liquid is superficial the frictional drag of a substantial body of liquid may be injurious, at the speeds of operation at which the present device operates satisfactorily. According to the present invention the strand passing through the relatively thin sheet of treating fluid encounters substantially no resistance from the fluid which is picked up and carried away as a thin sheath around the strand. The treating material flows freely toward the strands to replace that carried away and exerts substantially no transverse pressure on the strands.

The roll and frame structure just described, which makes up the strand storage and advancing element of a storage-treating unit 1, telescopes vertically into a housing or cell 36 (Figs. 7 and 8). Cell 36 is open at its top and bottom. Its sides, adjacent the upper end are cut away as at 37 to accommodate members 7. The members 7, outwardly of the cell, are provided with plates 38 the edges of which (Figs. 7 and 14) rest on members 39 carried by members 40 of the general frame of the machine. The storage treating element is thus suspended in its cell 36 and can be freely removed from or inserted in the cell through the top of the latter. The cells 36 are supported by cross members 36'. The channel members 2 are provided with guard members 41 to prevent the yarn on the unit and the combs 23 from coming in contact with the walls of the cell as the unit is being telescoped into or out of the latter. The unit is held centered in the cell by U-shaped blocks 42 secured to frame member 40 and engaging in notches 43 formed in the lower edges of plates 38.

Figure 2:
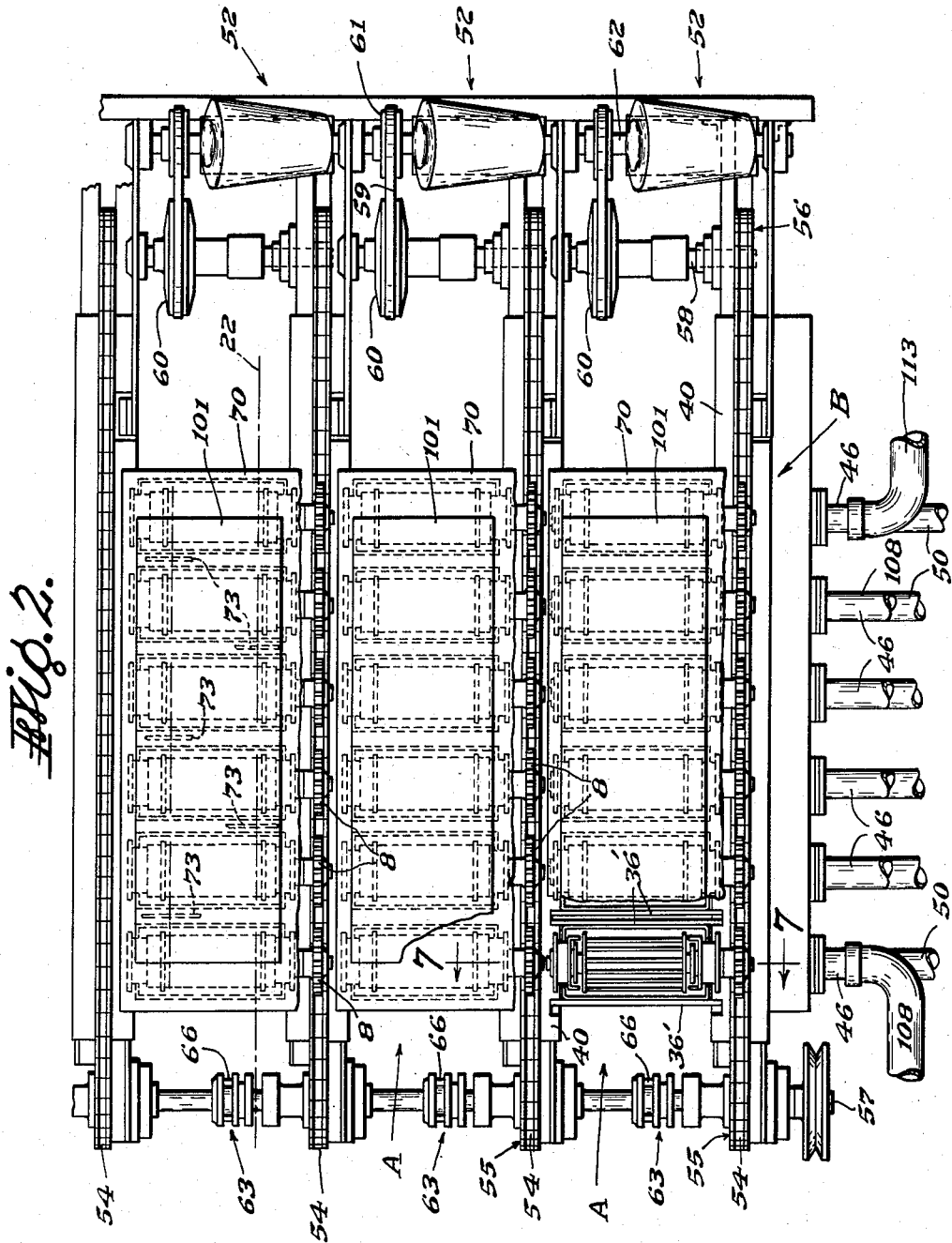
Fig. 2 is a fragmentary plan view of the rank and file assembly of storage-treating units of the machine shown in Fig. 1 but on a larger scale and with parts broken away.
Figure 3:
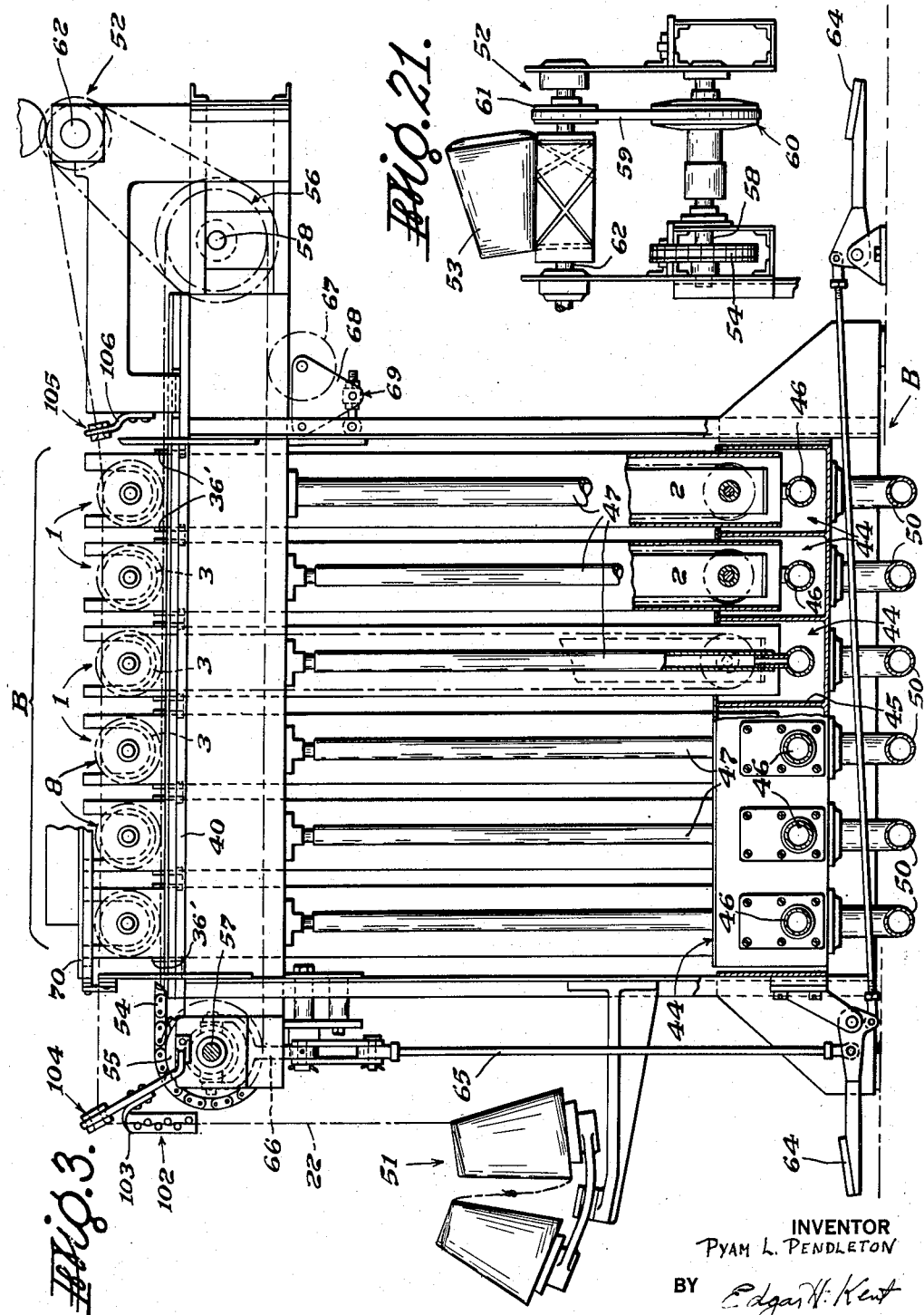
Fig. 3 is an elevational view of the structure shown in Fig. 2, parts being broken away.

As best shown in Figs. 3, 8 and 10, the lower end portion of each cell extends into a chamber 44 formed in the substructure of the machine. The arrangement of these chambers, which form part of the fluid supply and circulation system, is an element of the means by which the functions of the various units are integrated into a unitary operation of the machine as a whole. As shown in Figs. 1 and 2, and as previously mentioned, a series of units are arranged in files, the corresponding units of each file being arranged in ranks. The chambers 44 extend rank-wise of the machine, partitions 45 separating the units filewise. Extending through the chambers 44 are main fluid supply pipes 46 from which unit supply pipes 47 (Figs. 3 and 8) extend upwardly terminating in discharge nozzles 48 (Fig. 7). The nozzles 48 extend through openings 49 in the cell walls and are positioned to discharge liquid onto the member 25 of the uppermost fluid applying member of that unit.

The liquid not taken up by the traveling strand, drains through the open lower end of the cells into chambers 44 and passes through outlet pipes 50 for recirculation, either with or without going through a reclaiming, or other modifying process.

In general, whatever process is being carried out in the machine, an end of the strand to be treated is fed from a supply package 51 (Fig. 3) through the successive units of a file to a windup mechanism 52 where the treated strand is wound into a package 53.

As previously described, the upper roll 3 of each unit is provided with a drive sprocket 8. When the units are in operative position in their cells, the sprockets of a given file rest in driven relation on the upper run of a sprocket chain 54. The sprocket chains (Figs. 2 and 3) pass around sprockets 55 and 56 carried respectively by a main drive shaft 57 and stub shafts 58. The windup 52 of each file is driven from the shaft 58 of that file by a belt 59 passing around pulleys 60 and 61 carried respectively by the shafts 58 and the shaft 62 of the windup. The windup may be of any conventional or desired form and a detailed description thereof is not believed necessary.

Figure 4:
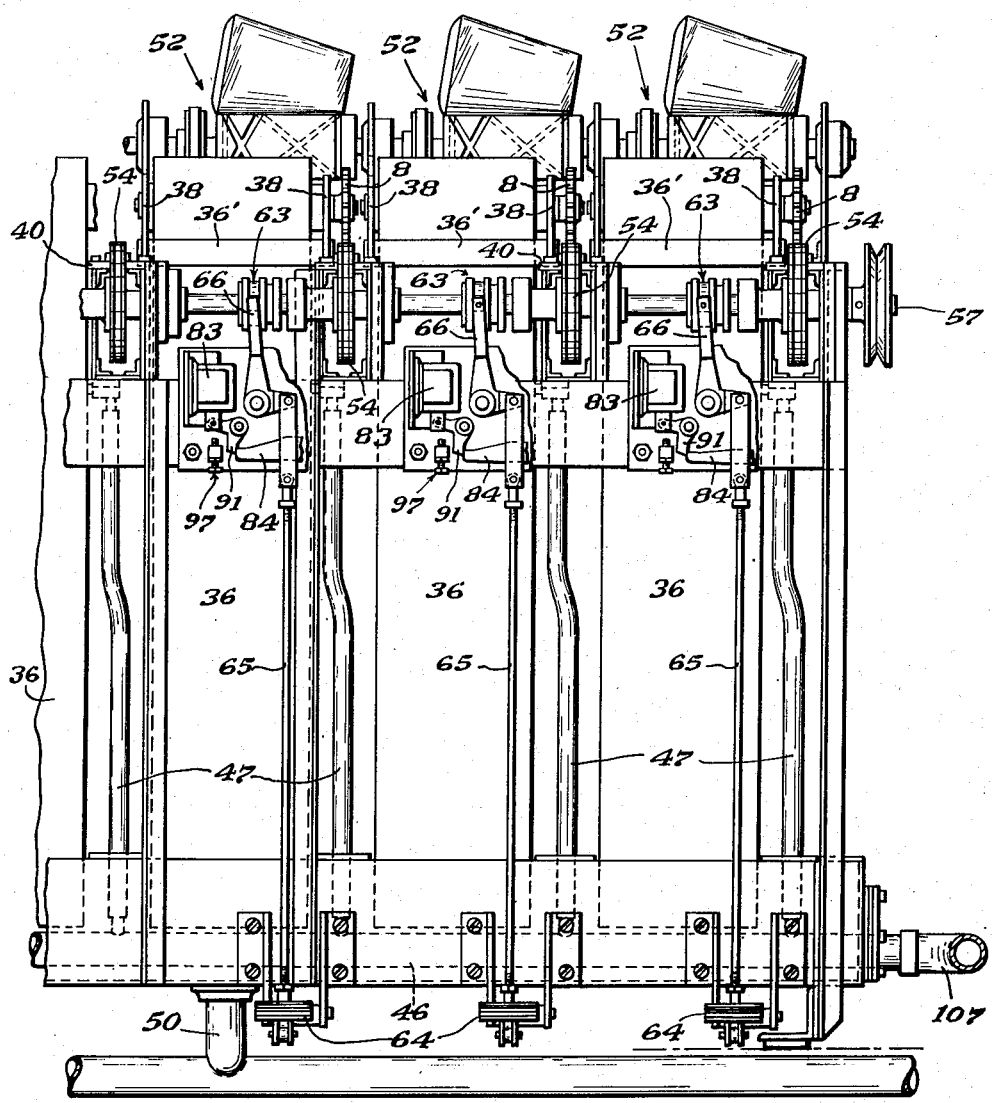
Fig. 4 is an elevational view looking from the left in Fig. 3, with parts broken away.

The sprockets 55 are connected to the main drive shaft 57 through individually operable clutches 63, by which the operation of a given file and its windup may be stopped or started independently of the other files. As shown in Figs. 3 and 4 the clutches 63 may be operated from foot pedals 64 connected by links 65 to the bell crank clutch forks 66.

The proper tension on the sprocket chains 54 is maintained or adjusted by means of any suitable device such as idle sprockets 67 (Fig. 3) mounted in swinging brackets 68, the position of which is determined by a screw and nut adjustment 69.

Each file of units is provided with a cover 70 best shown in Figs. 5 and 6. The covers 70 are hinged at 71 to frame members 72 to swing upwardly so as to provide access to the upper ends of the storage treating units for the insertion of the roll carrying frames into, and their removal from, the cells.

The covers 70 support a series of drop wires 73, shown in detail in Fig. 17, positioned between adjacent treating units. The upper end of each drop wire is fixed to one end of an arm 74 the other end of which is pinned at 75 to the operating shaft of a switch 76 carried by brackets 77 secured by screws 78 to the upper surface of the cover 70. The free ends of the drop wires extend through openings 79 and rest on the strand 22 as it travels from the upper roll of one unit to the upper roll of the succeeding unit. Loop shaped guard and stop members 80 bolted to the cover at 81 extend through the opening 79, the arms of the loop being positioned on opposite sides of the drop wire adjacent the point where the wires rest on the strands. When the strand is traveling under normal tension, the drop wires are supported in the position shown in Fig. 17, in which the switch 76 is held open. Should the tension on the strand substantially decrease, as by breakage of strand in one of the units, the wire affected thereby will drop, closing the switch to which it is connected.

The switches 76 in each file are connected in parallel, as diagrammatically indicated in Fig. 18, to control an electric circuit 82 supplying a solenoid 83. The solenoids are arranged as shown in the latter figure, to effect operation of clutch yoke 66 to stop the file drive in the event any switch in that file is closed by the downward movement of its drop wire. As shown the link 65, by which the yoke 66 is foot controlled as previously described, is pivotally connected to an arm 84 which is pivoted to the frame at 85. A rod 86 pivoted to arm 84 extends upwardly through an opening 87 formed in a fixed bracket 88. The upper end of rod 86 carries a collar 89, and a spring 90 compressed between collar 89 and bracket 88 tends to draw arm 84 and rod 65 upwardly to swing yoke 66 counterclockwise to disconnect the clutch 63. When link 65 is moved downwardly to move the yoke clockwise, to effect engagement of the clutch member to which it is connected, one arm 91 of a bell crank catch member pivoted to the frame at 92 swings, by gravity, above the free end of arm 84, as indicated in dotted lines in Fig. 18, to hold the clutch engaged. The other arm 93 of the catch is pivotally connected as at 94 to the armature 95 of the solenoid 83. When the solenoid is energized by the closing of one of the drop wire switches, catch arm 91 is drawn free of arm 84 as shown in full lines in Fig. 18 permitting spring 90 to actuate yoke 66 to disconnect the file drive clutch.

Adjustable stops 96 and 97 are provided to limit the movement of arms 66 and 93.

It is usually desirable to reduce to a minimum the amount of a treating liquid carried from one unit to the next by the traveling strand. As shown in Fig. 5 a stripper for this purpose is positioned to operate on the strand as it leaves the first and fifth units of each file. Preferably, and as shown in Figs. 19 and 20, these strippers comprise a pair of tubes 98, positioned on opposite sides of the traveling strand 22. The lower ends of the tubes are closed and the upper ends are connected by pipe connections 99 to a source of air or other suitable gaseous pressure not shown. The tubes 98 are provided with slots 100 through which jets of air are directed against the oncoming strand as shown in Fig. 20 to strip excess fluid from the surface of the strand before it leaves the unit.

Switches 76 and the portions of the drop wires and strippers which extend above the surface of cover 70 are enclosed in a penthouse 101 carried by the cover.

As the strand travels from its supply package 51 it preferably passes through a suitable tensioning device such as the staggered roll frame 102 (Fig. 3) supported by a bracket 103. Bracket 103 also supports a guide eye 104 which directs the strand into the first unit. A similar guide eye 105 carried by a bracket 106, mounted adjacent the file exit, directs the treated strand to its windup 52.

In carrying out a mercerizing process, mercerizing caustic of proper strength may be supplied to the main supply pipe 46 of the first rank of units by a pump 107 through a pipe 108 (Figs. 2 and 22) from a tank 109 and to which the drain pipe 50 of the first rank B returns the excess of caustic from the first rank of units by way of pipe 110. As the respective yarn ends to be mercerized travel through the first units, the traveling convolutions in their repeated passages through the caustic at the edges of the several flow conducting plates 32, carry away the constantly flowing supply of caustic. The caustic is thoroughly worked into and through the fibers of the yarn by the intermittent pressure exerted on the yarns by the rods 14 which form the surfaces of the rolls 3 and 10. The result is a complete and rapid reaction of the caustic on the cellulose of the yarn fibers. As the yarn ends leave the first rank of units the excess free caustic is stripped from the yarn by the air blast from the stripper tubes 98 at the exit of the first unit.

One of the effects of the caustic on the cellulose of the yarn fibers is to cause a swelling of the fibers and a tendency of the yarn to shrink in length. For best results the yarn should usually be held against shrinkage during its reaction in the caustic and for this reason the rolls of the first units will ordinarily have a zero taper. Mercerization, however, is carried out for many purposes and if it is desired to permit a degree of shrinkage, or on the other hand to stretch the yarn during the mercerization, the rolls may be given the appropriate taper as previously described. As the ends of yarn pass through the second, third, fourth and fifth units the convolutions are successively supplied with flows of wash water, by which the caustic is washed from the yarn. There is a tendency of the yarn to slacken as the excess caustic is washed out and it is usually desirable to increase the tension as it passes through the successive washing units. This is accomplished by suitably adjusting the taper of the rolls in the successive units. The actual increase in tension or the stretch imposed on the yarn will depend on the character of the yarn and the use to which it is to be put. By way of illustration, however, in a typical mercerizing operation the rolls in the first, second, third and fourth washing units may respectively be given 3%, 2–4%, 4–5% and 5–6% taper.

In this way, it is possible to apply tension in gradually increasing increments as the yarn passes through the testing units. The tension may thus be delicately controlled and, even at high speeds of operation, can be so applied as to prevent shrinkage of the yarn, or even to produce gain in length thereof, in the treatment.

In certain cases, particularly with the heavier strands, it may be desirable to apply a substantial increase in tension just before the strand leaves the unit or to apply the whole increase in tension at that point, as I have found that this produces a desirable stripping action on the strand. In such case, the rolls may be shouldered near their exit end to provide increased diameter and thus increased tension at that point, and may be either cylindrical or conical up to that point.

In the arrangement shown the wash water is fed to the respective main supply pipes 46 of the four washing ranks, C, D, E and F (see Fig. 22) from respective tanks 111 by pumps 112 through pipes 113. The wash water from the units of each rank mingles in the common return 50 of that rank and is fed back to the tank serving that rank through pipes 114, the circulation being completed through pipes 115 to the intakes of the pumps. There is thus a constant rank-wise circulation of the washing fluid. This circulation, however, is modified by the introduction of a filewise flow of liquid through the tanks 111. This is brought about by the feed of make up water to the tank 111 of the rank F as through a pipe 116 controlled by a valve 117 (Fig. 22). Tanks 111 are each provided with one or more overflow openings 118 leading to the preceding tank, by which the quantity of liquid is maintained in the several tanks. This filewise flow of liquid is in the opposite direction to the travel of the yarn through the files.

Considering the effect of this combined rank-wise and filewise circulation of the wash water it will be noted that as the caustic saturated yarn ends enter the several units of the rank C and pass through the washing units of that rank, substantially all the surface carried caustic plus a further amount washed out of the yarn is initially carried into the tank 111 below with the result that the concentration of caustic in the wash builds up to a relatively high percentage so that as it is recirculated its capacity to remove the caustic decreases. As this occurs the yarn ends enter the washing units of rank D carrying increasing residues of caustic. This in turn increases the caustic concentration of the water circulating in rank D and so on through ranks E and F. The concentrations decrease progressively from a maximum in rank C to a low value in rank F. Substantially complete absence of caustic in the yarn as it leaves the units of rank F may be assured by adding sufficient acid, such as acetic acid, to the fresh water flowing into the tank of rank F to maintain the water in that tank substantially neutral. For that purpose an acid tank 119 is provided which is connected to pipe 116 by a pipe 120 controlled by a valve 121.

The washing system as just described is advantageous either with or without caustic reclamation. Where the caustic is being reclaimed, the overflow from tank 111 of rank C is conducted by a pipe 122 to the storage tank of a reclaiming system. The feed of fresh liquid water to the last washing unit of each file and the reverse flow of liquid filewise is kept at a low rate so that the caustic concentration in the first washing unit C builds up to a desired high value suitable for reclaim purposes. If the caustic is not being reclaimed, the feed of fresh liquid to the last washing unit and the reverse flow through the units are maintained at a relatively high rate so that the caustic concentration in the first unit does not build up to a point which will substantially affect the efficiency of the wash, the purpose of the reverse flow in this case being to save wash water.

The reverse flow system of washing liquid may, however, be dispensed with as, for example, where caustic is not reclaimed and the cost of wash water is not a substantial factor. In such case, the tanks 111 are not needed, the main fluid supply pipes 46 for the units of ranks C, D and E being connected directly to a source of fresh water, the supply pipe 46 for the units of rank F being connected to a supply of fresh water mixed with a suitable quantity of neutralizing acid and the drain pipe 50 of each rank being connected to a waste water disposal system.

In the drying rank G, the feed pipe 47 to the individual supply pipes 46 of the units is connected to a source of warm air under pressure (not shown) by a pipe 126 (Fig. 22). The outlet 50 thereof may discharge to a return duct of a circulatory hot air system or to atmosphere. The distributors in the units of the drying rank differ from those in the preceding units in that, as shown in Fig. 15, the warm air is discharged in each drying unit through the cell wall opening 49 into a hood 123 carried by the upper member 25. The hood directs the current of air downwardly through openings 124 onto a distribution plate 125 similar in function to plates 31—32 previously described which direct the air outwardly against the traveling sheet of yarn convolutions. A portion of the heated air passes through openings 126 to successive distributors identical with that just described except that they of course carry no hood.

In practice one or more reserve frames for the units will be kept threaded. In the event of breakage of the yarn or strand in any unit, the stop mechanism previously described will disconnect the power to the file in which the break occurs. The cover of that file is then raised, the roll frame on which the strand is broken is removed bodily from its cell, a threaded reserve frame is put in its place and the yarn thereon tied in to reestablish the continuity of the yarn in the file. Pedal 64 of the file is then depressed to reengage the file drive clutch 63 whereupon operation of the file is resumed.

The replacing of a roll-frame in the mercerizing treatment above described may be variously carried out to minimize the loss of mercerized yarn. For example, in the case of breakage in a caustic cell, the replacement frame of grey yarn may be "dunked" or flushed with caustic just before or after it is placed in the cell. In the case of breakage in the first wash cell, it may be replaced by the frame in the caustic cell and the caustic cell refilled with a reserve frame of grey yarn, dunked or flushed as just described. In the case of breakage in the second, third or fourth washing cells or in the drying cell, the replacement frame is preferably filled with mercerized yarn instead of grey yarn.

While the invention has been described and illustrated in an embodiment suitable for mercerizing, it is capable of carrying out many other strand-treating operations such as yarn dyeing, resin impregnation, bleaching, moth and fire proofing treatments, to name only a few. The high speed of operation, the efficiency and uniformity of the application or removal of the treating fluids and the direct package to package operation all make for greater economy in production of treated strand materials, as well as a higher quality of product. For example, the treating units are particularly well suited for the treatment of yarns with dyes which penetrate with difficulty, such as vat and napthol dyes on cotton and rayon yarns. In a suitable arrangement for dyeing yarns, the yarn is wet out with water and a wetting agent in a first unit, the dye is applied thereto in a second unit, a third unit applies rinsing water, a fourth unit applies an oxidizing agent solution, the yarn is washed in a fifth unit and dried in a sixth unit.

While ordinarily a plurality of treating units will be employed in succession or file for the treatment of a single strand, this is, of course, not essential, as the unit per se is a complete strand-treating apparatus and may be advantageously used singly for the performance of a single impregnation or washing step, as well as in multiple for multi-step or stage treatments. The number of units employed for the processing of a single strand is therefore an optional variable depending upon the nature of the process, the number of different treatments to be applied therein, the strand capacity of the units and the length of time required for a given treatment, etc.

I claim:

1. A machine for the fluid treatment of a continuously traveling strand, which comprises a plurality of storage-treating units, arranged in file, through which the strand travels successively from one unit to another, each unit comprising a cell open at its top, a frame removably suspended in said cell, a pair of vertically spaced rolls rotatably mounted in said frame and about which the strand travels in a plurality of convolutions, means to drive one roll of each said pair and means for feeding a controlled amount of treating fluid to the strand convolutions between said rolls.

2. A machine for the fluid treatment of a continuously traveling strand which comprises a plurality of storage treating units, arranged in file, through which the strand travels successively from one unit to another, each unit comprising a cell, a frame removably supported in said cell, a rotary member rotatably mounted in said frame about which the strand travels in a plurality of convolutions and means for supplying treating fluid to said convolutions, a driving member extending lengthwise of the file and means releasably connecting said rotary member of each unit in driven relation to said driving member.

3. A machine for the fluid treatment of a continuously traveling strand which comprises a plurality of vertical storage treating units, arranged in file, through which the strand travels successively from one unit to another, each unit comprising a cell, a frame removably supported in said cell, a pair of vertically spaced rollers mounted on said frame about which the strand is wound in a plurality of contiguous courses to form a sheet of moving strand and means for applying a controlled quantity of treating fluid to said strand in said courses, and a driving member extending lengthwise of the file and releasably connected in driving relation to one said roller of each unit.

4. A machine in accordance with claim 3 in which the fluid applying means consists of a plate member mounted on the frame intermediate said rollers in a plane transverse to the plane of said sheet and having an edge extending adjacent thereto and a fluid supplying device adapted to provide said plate member with a film of treating fluid extending over said edge thereof and in contact with said strand.

5. Apparatus for the fluid treatment of a continuous traveling strand which comprises a supporting frame, a pair of vertically spaced rolls mounted in said frame, said rolls being adapted to support the traveling strand as a plurality of convolutions temporarily forming spaced oppositely traveling substantially vertical planar sheets composed of contiguous courses of moving strand, a plurality of vertically spaced plates mounted on said frame between said rolls, said plates having horizontal upper surfaces with their opposite edges extending closely adjacent said sheets of strand, a conduit for supplying treating fluid to the upper surface of the uppermost of said plates, at least all but the lowermost of said plates having openings to permit the flow therethrough onto the next lower plate of surplus treating fluid, whereby said fluid will form a thin flaccid flowing film of treating fluid extending over the opposite edges of each of said plates into contact with said strand and whereby in each of said courses said strand will engage and pick up fluid only from the over-extending marginal portions of each of said films.

6. Apparatus for the fluid treatment of a continuous traveling strand which comprises a supporting frame, a pair of vertically spaced rolls mounted in said frame, said rolls being adapted to support the traveling strand as a plurality of convolutions temporarily forming spaced oppositely traveling substantially planar sheets composed of contiguous courses of moving strand, a plurality of vertically spaced plates mounted on said frame between said rolls, said plates having horizontal upper surfaces with their opposite edges extending closely adjacent said sheets of strand, a conduit for supplying treating fluid to the upper surface of the uppermost of said plates, at least all but the lowermost of said plates having openings to permit the flow therethrough onto the next lower plate of surplus treating fluid, whereby said fluid will form a thin flaccid flowing film of treating fluid extending over the opposite edges of each of said plates into contact with said strand and whereby in each of said courses said strand will engage and pick up fluid only from the over-extending marginal portions of each of said films.

7. Apparatus for the fluid treatment of a continuous traveling strand which comprises a supporting frame, a pair of vertically spaced rolls mounted in said frame, said rolls being adapted to support the traveling strand, as a plurality of convolutions temporarily forming oppositely traveling substantially planar sheets composed of contiguous courses of moving strand, a plurality of vertically spaced plates mounted on said frame between said rolls, said plates having horizontal upper surfaces with their edges extending closely adjacent the sheets of strand, a conduit for supplying treating fluid to the upper surface of the uppermost of said plates, at least all but the lowermost of said plates having openings to permit the flow therethrough onto the next lower plate of surplus treating fluid whereby said fluid will form a thin flaccid flowing film of treating fluid extending over the edge of each of said plates into contact with said strand and whereby in each of said courses said strand will engage and pick up fluid only from the over-extending marginal portions of each of said films.

8. Apparatus for the fluid treatment of a continuous traveling strand which comprises a supporting frame, a pair of vertically spaced rolls mounted in said frame, said rolls being adapted to support the traveling strand as a plurality of convolutions temporarily forming oppositely traveling substantially planar sheets composed of contiguous courses of moving strand, a plurality of vertically spaced plates and means for mounting the same upon said frame between said rolls, said plates having horizontal upper surfaces with their edges extending closely adjacent the sheets of strand but spaced therefrom and means for supplying treating fluid to the upper surface of each of said plates, whereby said fluid will form a thin flaccid flowing film of treating fluid extending over the edge of each of said plates into contact with said strand and whereby in each of said courses said strand will engage and pick up fluid only from the over-extending marginal portions of each of said films.

PYAM L. PENDLETON.

References Cited in the file of this patent

UNITED STATES PATENTS

| Number | Name | Date |
|---|---|---|
| 789,260 | Crompton | May 9, 1905 |
| 1,240,625 | Taylor | Sept. 18, 1917 |
| 1,259,526 | Knibiehler | Mar. 19, 1918 |
| 1,398,043 | Rau | Nov. 22, 1921 |
| 1,424,100 | Johnson | July 25, 1922 |
| 1,561,445 | Elsaesser | Nov. 10, 1925 |
| 1,635,245 | Brandli | July 12, 1927 |
| 1,710,607 | Brewin | Apr. 23, 1929 |
| 1,889,048 | Haggenmacher | Nov. 29, 1932 |
| 1,934,796 | Friederich | Nov. 14, 1933 |
| 1,983,221 | Furness | Dec. 4, 1934 |
| 2,106,311 | Whitehead | Jan. 25, 1938 |
| 2,108,285 | Forrest | Feb. 15, 1938 |
| 2,272,182 | Burkholder et al. | Feb. 10, 1942 |
| 2,287,031 | Frohwein | June 23, 1942 |
| 2,296,035 | Hill | Sept. 15, 1942 |
| 2,308,576 | Kornegg | Jan. 19, 1943 |
| 2,346,696 | Moritz | Apr. 18, 1944 |
| 2,369,769 | Bauer | Feb. 20, 1945 |
| 2,416,534 | Naumann | Feb. 25, 1947 |
| 2,481,916 | Ewing | Sept. 13, 1949 |

FOREIGN PATENTS

| Number | Country | Date |
|---|---|---|
| 522,383 | Germany | Apr. 13, 1931 |